United States Patent
Hilty et al.

(10) Patent No.: US 11,583,953 B1
(45) Date of Patent: Feb. 21, 2023

(54) METHOD OF FORMING PLANETARY CARRIER ASSEMBLY

(71) Applicant: Schaeffler Technologies AG & Co. KG, Herzogenaurach (DE)

(72) Inventors: Drew Hilty, Wooster, OH (US); Justin Persinger, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/394,666

(22) Filed: Aug. 5, 2021

(51) Int. Cl.
*B23K 26/21* (2014.01)
*F16H 57/08* (2006.01)
*B23K 101/00* (2006.01)

(52) U.S. Cl.
CPC ........ *B23K 26/21* (2015.10); *B23K 2101/008* (2018.08); *F16H 57/082* (2013.01)

(58) Field of Classification Search
CPC .. B23K 26/21; B23K 2101/008; F16H 57/082
See application file for complete search history.

(56) References Cited

U.S. PATENT DOCUMENTS

| | | | | |
|---|---|---|---|---|
| 4,043,021 A | * | 8/1977 | Mosbacher | F16H 57/082 475/331 |
| 6,422,971 B1 | * | 7/2002 | Katou | F16H 1/28 475/331 |
| 7,316,629 B2 | * | 1/2008 | Nakagawa | F16H 57/082 475/331 |
| 9,157,521 B2 | * | 10/2015 | Harada | F16H 3/663 |
| 2004/0077455 A1 | * | 4/2004 | Huber | F16H 57/082 475/331 |
| 2004/0235610 A1 | * | 11/2004 | Jang | F16H 57/082 475/331 |

FOREIGN PATENT DOCUMENTS

DE  102019117489 A1  12/2020

* cited by examiner

*Primary Examiner* — David P Bryant
*Assistant Examiner* — Christine Bersabal
(74) *Attorney, Agent, or Firm* — Volpe Koenig

(57) ABSTRACT

A method of forming a planetary carrier assembly is disclosed herein. In one aspect, the method includes providing a first carrier plate and a second carrier plate. The first carrier plate has a first body portion, and the second carrier plate has a second body portion including a plurality of legs. The method includes forming at least one staking element on an axial end of at least one of the plurality of legs. The method includes fixing the first carrier plate and the second carrier plate to each other via application of an axial load such that the at least one staking element on the at least one of the plurality of legs digs into the first carrier plate.

20 Claims, 5 Drawing Sheets

METHOD OF FORMING PLANETARY CARRIER ASSEMBLY

FIELD OF INVENTION

The present disclosure is directed to a formation method for a planetary carrier assembly.

BACKGROUND

Planetary plate assemblies are well known. These known plate assemblies may consist of two carrier plates spaced apart from each other by a predetermined distance. Axles or pins can be secured at opposing ends to the two carrier plates and are configured to support planetary gears. Planetary carriers or plate assemblies support planetary components or gears, which require very precise tolerances.

Assembling planetary plate assemblies can require fixing two or more disparate plate carrier elements to each other. Known techniques for achieving a connection between the plate carrier elements have certain drawbacks. For example, parallelism between the plate carrier element can be shifted out of alignment, which renders the partially assembled components inoperable and therefore these components must be discarded, resulting in waste and increased scrap rates.

Accordingly, it would be desirable to provide an improved method of forming a planetary carrier assembly.

SUMMARY

A method of forming a planetary carrier assembly is disclosed herein. In one aspect, the method includes providing a first carrier plate and a second carrier plate. The first carrier plate has a first body portion, and the second carrier plate has a second body portion including a plurality of legs. The method includes forming at least one staking element on an axial end of at least one of the plurality of legs. The method includes fixing the first carrier plate and the second carrier plate to each other via application of an axial load such that the at least one staking element on the at least one of the plurality of legs digs into or otherwise is fixed to the first carrier plate.

In one aspect, the method further comprises welding an area defined at an interface between the plurality of legs and the first carrier plate. The welding step can be configured to consume the staking element.

The staking element can be formed on each of the of legs. The staking element can be formed on a radially inner edge of the axial end of the legs in one aspect. In another aspect, the staking element is formed on a radially outer edge of the axial end of the legs.

The second carrier plate can include a plurality of emboss elements on an upper axial face of the second body portion. The axial load can at least be applied to the plurality of emboss elements of the second carrier plate.

In one aspect, a height of the staking element is 0.25 mm-0.75 mm. In one aspect, a height of the staking element is less than 0.50 mm.

The staking element can be defined in a circumferentially medial region of the axial end of the legs.

In another aspect, a method of forming a planetary carrier assembly is disclosed that includes attaching a first carrier plate with a second carrier plate via application of a load to at least one of the first carrier plate or the second carrier plate, such that a staking element on the second carrier plate digs into the first carrier plate. The method also includes laser welding an area defined at the staking element such that the staking element is consumed by the laser welding.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1:
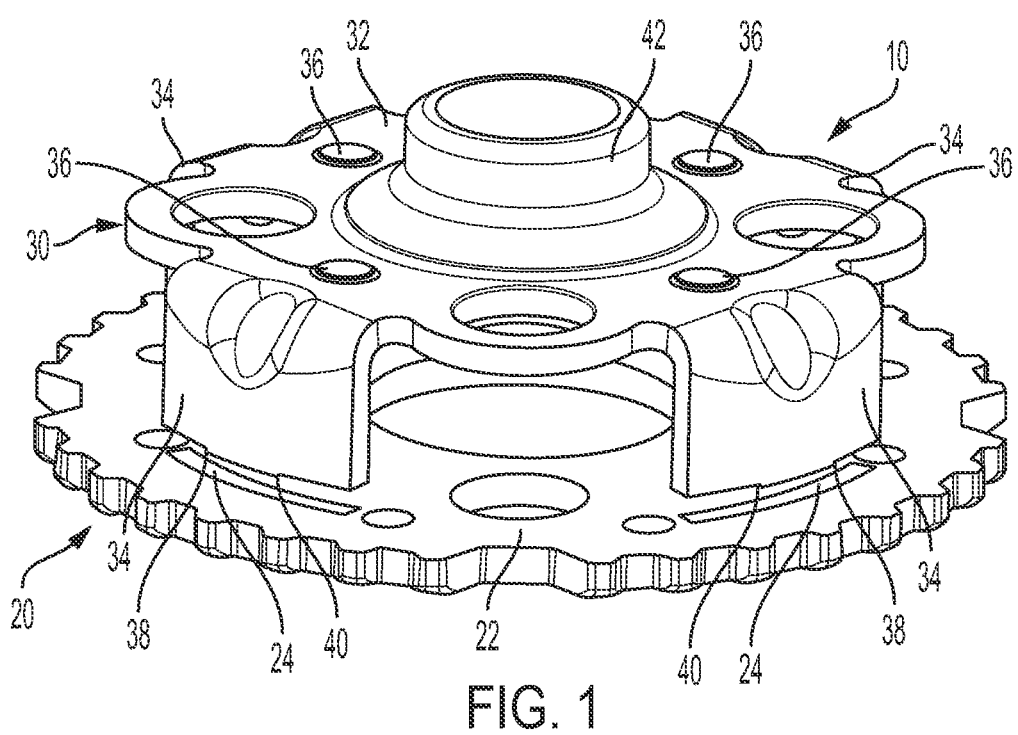
FIG. 1 is a perspective view of a planetary carrier assembly according to one aspect.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A method of forming a planetary carrier assembly 10 is disclosed. The method includes providing a first carrier plate 20 and a second carrier plate 30, which are shown in FIG. 1 prior to assembly. The first carrier plate 20 has a first body portion 22. In one aspect, the first body portion 22 has a flat profile. The first body portion 22 can include a central opening configured to be mounted on a shaft, and a plurality of holes or openings configured to support a plurality of planetary gear pins or axles. An outer edge of the first body portion 22 can include a gear. One of ordinary skill in the art would understand that features of the first carrier plate 20 can vary.

In one aspect, the first carrier plate 20 and the second carrier plate 30 are stamped components. One of ordinary skill in the art would recognize that these components can be formed from other formation processes or means.

The second carrier plate 30 has a second body portion 32 including a plurality of legs 34. In one aspect, these legs 34 are considered spider legs. The plurality of legs 34 can include at least two legs. In one aspect, the plurality of legs 34 includes four legs. The second body portion 32 can similarly define a central opening configured to be mounted on a shaft, and a plurality of holes or openings configured to support a plurality of planetary gear pins or axles. A central collar 42 can be provided that has an axial extension and defines a bearing or support surface for mounting the second carrier plate 30 on a shaft.

The method includes forming at least one staking element 40 on an axial end 38 of at least one of the legs 34 of the second carrier plate 30. In one aspect, the staking element 40 is formed on each of the legs 34.

Figure 2:
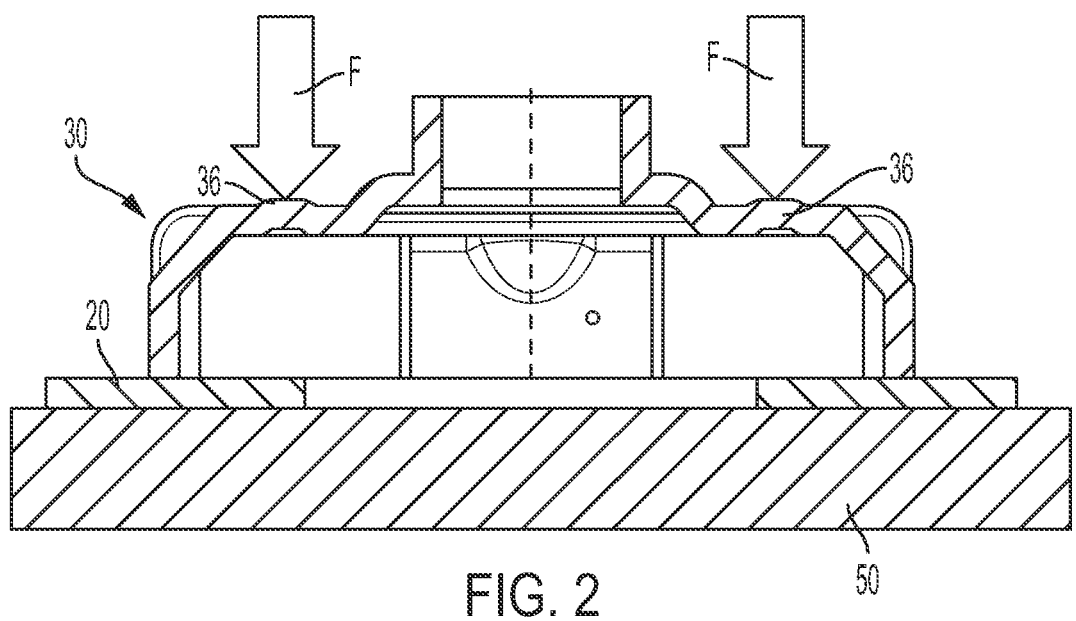
FIG. 2 is a side cross-sectional view of the planetary carrier assembly during an assembly step.

The method includes fixing the first carrier plate 20 and the second carrier plate 30 to each other. In one aspect, the first carrier plate 20 and the second carrier plate 30 can be pressed together for fixing via application of an axial load (F) such that the staking elements 40 on the legs 34 dig into the first carrier plate 20. This step is shown in FIG. 2. As shown in FIG. 2, a support element 50, such as a support surface of clamping element, can be provided on which the first carrier plate 20 is arranged during this step. One of ordinary skill in the art would understand from this disclosure that alternative types of clamping or pressing assemblies can be used to fix the first carrier plate 20 and the second carrier plate 30 to each other. In one aspect, the two carrier plates 20, 30 are clamped together or joined together with at least a 1 kN load-8 kN load. In one aspect, the load can be 3-5 kN. Due to the staking elements 40, this load does not cause the carrier plates 20, 30 to undergo any undesirable deformation that would cause the carrier plates 20, 30 to be deformed out of alignment or out of the precise tolerances required for this type of carrier plate assembly. In one aspect, any misalignment or parallelism issues are avoided to ensure a perpendicular connection through the carrier plates for axles or pins. In one aspect, a parallelism tolerance of 0.2 mm is provided by the formation method disclosed herein. In another aspect, a parallelism tolerance of 0.1 mm is provided by the formation method disclosed herein. In one aspect, the staking elements 40 prevent radially outward movement of the legs 34 during application of the fixing load. Without the staking elements 40, the legs 34 would otherwise tend to be driven radially outward upon application of the load. The staking elements 40 therefore act as a fixing element that dig into the first carrier plate 20 during this loading step and ensure that the legs 34 remain relatively fixed in the radial direction.

The second carrier plate 30 can include emboss elements 36 on an upper axial face of the second body portion 32. These emboss elements 36, which define an axial protrusion, can define areas for applying the axial load (F).

The method can also include welding an area defined at an interface between the at least one of the plurality of legs 34 and the first carrier plate 20 after the staking elements 40 have embedded into or dug into the first carrier plate 20. In one aspect, the welding step includes laser welding. This step is shown by at least FIG. 5, which shows the laser weld region 60 and the laser (L) being applied to area between the first and second carrier plates 20, 30.

Fixation areas 24 can be defined on the first carrier plate 20. The fixation areas 24 can be defined as flat surfaces that are coplanar with the axial surface of the first carrier plate 20. In another aspect, the fixation areas 24 can be recessed relative to a remainder of the axial end face of the first carrier plate 20, such that the fixation areas 24 define receptacles or pockets dimensioned to receive the leg 34.

Figure 3:
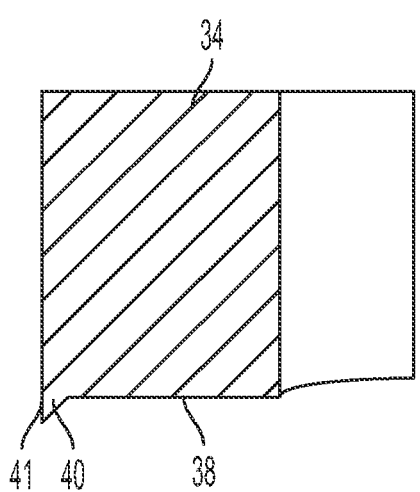
FIG. 3 is a cross-sectional view of one leg of a second carrier plate according to one aspect.
Figure 4:
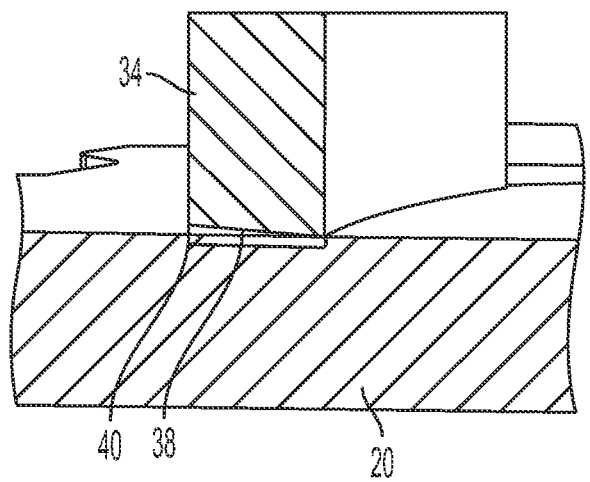
FIG. 4 is a cross-sectional view of one leg of the second carrier plate engaged with a body of a first carrier plate according to one aspect.
Figure 5:
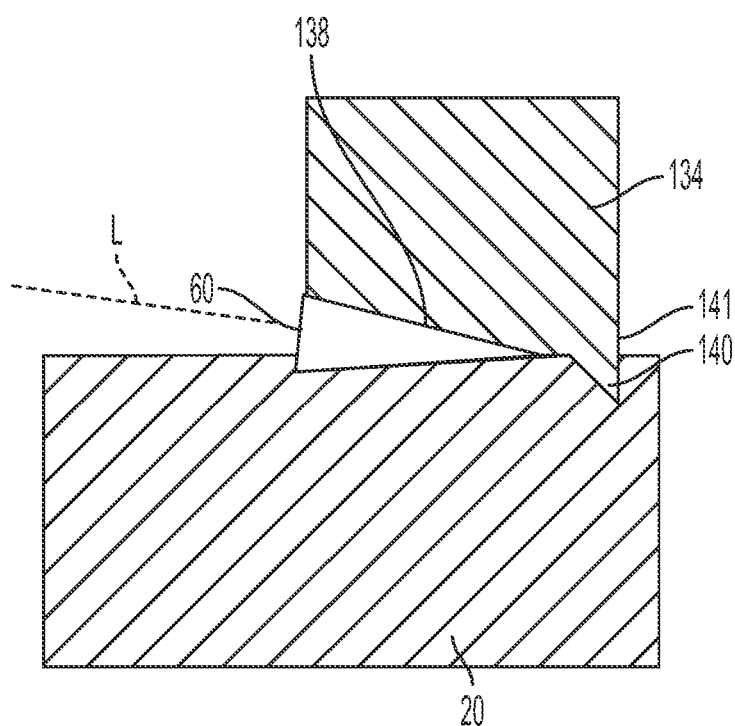
FIG. 5 is an additional cross-sectional view of one leg of the second carrier plate engaged with a body of a first carrier plate according to another aspect.

As shown in FIGS. 3 and 4, the staking element 40 is formed on a radially outer edge 41 of the axial end 38 of the leg 34. As shown in FIG. 5, the staking element 140 can be formed on a radially inner edge 141 of the axial end 138 of the leg 134. In one aspect, the staking element can be formed in a radially medial area of the leg 34. In another aspect, multiple staking elements on a single leg could be provided. For example, one staking element may be on the radially outer edge 41 and one staking element may be on the radially inner edge 141.

The staking elements 40 are generally illustrated having a triangular profile in the Figures. One of ordinary skill in the art would recognize that dimensions, location, orientation, shape, etc., of the staking elements 40 can vary. In one aspect, a height of the staking element 40 is 0.25 mm-0.75 mm. In another aspect, the height of the staking element 40 is less than 0.50 mm. The staking element 40 is defined in a circumferentially medial region of the axial end 38 of the legs 34, in one aspect. In another aspect, the staking element 40 extends for an entirety of a circumferential extent of the axial end 38 of the leg 34. In one aspect, the staking element 40 can include more than one pointed region. A width or thickness of the staking element 40 at its base can be 5%-15% of an entire width or thickness of the leg 34.

The method disclosed herein can include any one or more additional steps that occur before, during, or after any of the other steps disclosed herein. For example, in one aspect, additional machining steps can be performed on the first or second carrier elements 20, 30.

In one aspect, the planetary carrier assembly 10 can be subjected to a further stress relief processing step. For example, the planetary carrier assembly 10 can undergo a thermal process in order to resolve residual stresses in the planetary carrier assembly 10. In one aspect, the planetary carrier assembly 10 is arranged within a furnace to heat the planetary carrier assembly 10.

In one aspect, the planetary carrier assembly 10 undergoes further machining steps. For example, the planetary carrier assembly 10 can be polished or machined to modify any dimensions or meet specific tolerances.

Figure 6:
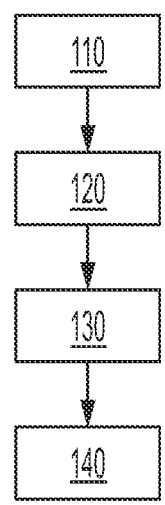
FIG. 6 is a flow chart illustrating method steps associated with one aspect of the present disclosure.

FIG. 6 illustrates a flow chart showing method steps associated with one aspect of the present disclosure. As shown in FIG. 6, the method comprises step 110 which includes providing a first carrier plate 20 and a second carrier plate 30. Step 120 includes forming at least one staking element 40 on an axial end 38 of at least one of a plurality of legs 34 of the second carrier plate 30. Step 130 includes fixing the first carrier plate 20 and the second carrier plate 30 to each other via application of an axial load (F) such that the staking element 40 on the leg 34 digs into the first carrier plate 20. Step 140 includes welding an area defined at an interface between the leg 34 and the first carrier plate 20. Additional method steps not illustrated in FIG. 6 can be included. In one aspect, step 110 can include forming components of the second carrier plate 30, such as the plurality of legs 34.

As described herein, in one aspect, the staking element 40 is provided to prevent distortion of the planetary carrier assembly 10 during at least one formation step. In particular, the staking element 40 prevents deformation, misalignment, or other undesirable deformation of the planetary carrier assembly 10 during an axial loading step.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS planetary carrier assembly 10
first carrier plate 20
first body portion 22
fixation areas 24
second carrier plate 30
second body portion 32
legs 34, 134
emboss elements 36
axial end 38, 138 of leg
staking element 40
radially outer edge 41 of leg
support element 50
laser weld region 60
radially inner edge 141 of leg

What is claimed is:

1. A method of forming a planetary carrier assembly, the method comprising:
   providing a first carrier plate and a second carrier plate, the first carrier plate having a first body portion, and the second carrier plate having a second body portion including a plurality of legs;
   forming at least one staking element on an axial end of at least one of the plurality of legs; and
   fixing the first carrier plate and the second carrier plate to each other via application of an axial load such that the at least one staking element on the at least one of the plurality of legs digs into the first carrier plate.

2. The method according to claim 1, further comprising welding an area defined at an interface between the at least one of the plurality of legs and the first carrier plate.

3. The method according to claim 2, wherein the welding consumes the at least one staking element.

4. The method according to claim 1, wherein the at least one staking element is formed on each of the plurality of legs.

5. The method according to claim 1, wherein the at least one staking element is formed on a radially inner edge of the axial end of the at least one of the plurality of legs.

6. The method according to claim 1, wherein the at least one staking element is formed on a radially outer edge of the axial end of the at least one of the plurality of legs.

7. The method according to claim 1, wherein the second carrier plate includes a plurality of emboss elements on an upper axial face of the second body portion, wherein the axial load is at least applied to the plurality of emboss elements of the second carrier plate.

8. The method according to claim 1, wherein a height of the at least one staking element is 0.25 mm-0.75 mm.

9. The method according to claim 1, wherein a height of the at least one staking element is less than 0.50 mm.

10. The method according to claim 1, wherein the at least one staking element is defined in a circumferentially medial region of the axial end of the at least one of the plurality of legs.

11. A method of forming a planetary carrier assembly, the method comprising:
    attaching a first carrier plate with a second carrier plate via application of a load to at least one of the first carrier plate or the second carrier plate such that at least one staking element on the second carrier plate digs into the first carrier plate; and
    laser welding an area defined at the at least one staking element such that the at least one staking element is consumed by the laser welding.

12. The method according to claim 11, wherein the first carrier plate and the second carrier plate are stamped components.

13. The method according to claim 11, wherein the at least one staking element is formed on an axial end of a leg of the second carrier plate.

14. The method according to claim 11, wherein the second carrier plate includes a plurality of emboss elements on an upper axial face of a second body portion, wherein the load is at least applied to the plurality of emboss elements of the second carrier plate.

15. The method according to claim 11, wherein a height of the at least one staking element is 0.25 mm-0.75 mm.

16. The method according to claim 11, wherein the at least one staking element is formed on a radially inner edge of an axial end of at least one leg formed on the second carrier plate.

17. The method according to claim 11, wherein the at least one staking element is formed on a radially outer edge of an axial end of at least one leg formed on the second carrier plate.

18. The method according to claim 11, wherein the at least one staking element is defined in a circumferentially medial region of an axial end of at least one leg formed on the second carrier plate.

19. The method according to claim 11, wherein at least one fixation area is defined on the first carrier plate in a region where the at least one staking element digs into the first carrier plate, and the at least one fixation area is defined as a flat surface.

20. The method according to claim 11, wherein the at least one staking element has a height of 0.25 mm-0.75 mm, the at least one staking element has a triangular profile, and the at least one staking element is defined in a circumferentially medial region of an axial end of at least one leg formed on the second carrier plate.

* * * * *